(12) United States Patent
Haubennestel et al.

(10) Patent No.: US 7,122,599 B2
(45) Date of Patent: Oct. 17, 2006

(54) COATING COMPOSITIONS AND POLYMERIC MOULDING COMPOUNDS HAVING ANTI-ADHESION AND DIRT REPELLENCY PROPERTIES

(75) Inventors: Karlheinz Haubennestel, Wesel (DE); Alfred Bubat, Wesel (DE); Albert Frank, Xanten (DE); Axel Woocker, Rees (DE); Udo Krappe, Emmerich (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 09/967,504

(22) Filed: Sep. 28, 2001

(65) Prior Publication Data

US 2002/0103288 A1 Aug. 1, 2002

(30) Foreign Application Priority Data

Sep. 29, 2000 (DE) .............................. 100 48 259

(51) Int. Cl.
*C08L 43/04* (2006.01)
(52) U.S. Cl. ..................... 525/100; 525/105; 525/106; 526/279
(58) Field of Classification Search ............... 525/100, 525/106, 105; 526/279
See application file for complete search history.

(56) References Cited

U.S. PATENT DOCUMENTS

| | | | | |
|---|---|---|---|---|
| 4,728,571 A * | 3/1988 | Clemens et al. | ............ | 428/352 |
| 4,759,991 A | 7/1988 | Kanno et al. | | |
| 4,812,518 A | 3/1989 | Haubennestel et al. | ..... | 525/100 |
| 4,988,506 A * | 1/1991 | Mitra et al. | ............ | 424/70.122 |
| 5,258,458 A * | 11/1993 | Allewaert et al. | .......... | 525/104 |
| 5,536,782 A * | 7/1996 | Takarada et al. | ............ | 525/100 |
| 5,919,879 A * | 7/1999 | Midha et al. | ................ | 526/279 |
| 5,952,103 A * | 9/1999 | Shiokawa et al. | .......... | 428/409 |
| 6,054,534 A | 4/2000 | Josten et al. | ................. | 525/100 |
| 6,248,316 B1 * | 6/2001 | Peffly et al. | .............. | 424/70.12 |
| 6,313,249 B1 * | 11/2001 | Nakanishi et al. | .......... | 526/279 |
| 6,440,572 B1 * | 8/2002 | Yokoyama et al. | ......... | 428/447 |
| 6,524,564 B1 * | 2/2003 | Kim et al. | ................ | 424/70.12 |
| 6,703,008 B1 * | 3/2004 | Carballada et al. | ........ | 424/70.1 |

FOREIGN PATENT DOCUMENTS

| | | |
|---|---|---|
| JP | 58154766 | 9/1983 |
| JP | 59126478 | 7/1984 |
| JP | 11189701 | 7/1999 |

OTHER PUBLICATIONS

Merriam-Webster OnLine defintion of "enamel".*
Grant and Hackh's Chemical Dictionary definition of "varnish".*
Ito, K.., "Polymeric Design by Macromonomer Technique", *Prog. Polym. Sci.*, 23, (1998), pp. 581-620.

* cited by examiner

*Primary Examiner*—Margaret G. Moore
(74) *Attorney, Agent, or Firm*—Schwegman, Lundberg, Woessner & Kluth P.A.

(57) ABSTRACT

The invention relates to coating compositions having anti-adhesion and dirt repellency properties, these compositions being admixed as additive with from 0.1 to 10% by weight, based on the solids content of the coating composition, of a branched polymer which possesses a weight-average molecular weight of from 2000 to 200,000 and comprises a polymeric base molecule and also polydiorganosiloxane side chains which are bonded covalently to the base molecule via Si—C bonds, have a weight-average molecular weight of between 1000 and 30,000, and whose fraction of the total weight of the branched polymer is from 5 to 25% by weight. The present invention further relates to polymeric moulding compounds having anti-adhesion and dirt repellency properties, to which this branched polymer is added as additive in an amount of from 0.1 to 10% by weight, based on the total weight of the polymeric moulding compounds. The invention additionally relates to the use of the branched polymers as additives for coating compositions and polymeric moulding compounds.

24 Claims, No Drawings

COATING COMPOSITIONS AND POLYMERIC MOULDING COMPOUNDS HAVING ANTI-ADHESION AND DIRT REPELLENCY PROPERTIES

RELATED APPLICATION

This application claims priority under 35 USC 119 from German Application No. 100 48 259.7, filed Sep. 29, 2000, which application is incorporated herein by reference.

The present invention relates to coating compositions and polymeric moulding compounds having anti-adhesion and dirt repellency properties and to the use of branched polymers as additives in coating compositions and polymeric moulding compounds.

It is known to add polysiloxanes to coatings and polymeric moulding compounds in order to achieve certain qualities, for example improved scratch resistance for furniture varnishes and vehicle finishes, or anti-adhesion properties for paper coatings. Use of the polysiloxanes is widespread and very diverse.

DE-A-35 35 283 describes polysiloxanes containing polyester groups for paints and moulding compounds, to which the polysiloxane gives an anti-adhesion quality. However, to achieve an adequate effect requires a very high additive concentration, so that other paint properties may be adversely affected.

EP-A-0 835 897 describes silicone poly(meth)acrylates, prepared from alkoxysiloxanes and hydroxy-functional poly(meth)acrylates, which may be used as additives to coating compositions. The drawback of these compounds, however, is the linking of the polymer segments via a hydrolytically unstable Si—O—C bond, with the consequence that the anti-adhesion effect of the coating compositions is not maintained over a prolonged period of time.

JP-11189701 describes a curable, two-component composition possessing anti-adhesion properties. Besides a crosslinker, the composition this document discloses includes a branched polymer comprising a base molecule to which the polydimethylsiloxane side chains are attached via a Si—C bond. The drawback of this composition, however, is that the branched polymer is used as sole binder component, and reacts with the crosslinkers by way of OH groups. The use of branched polymers of this kind, therefore, does not constitute a universal improvement of the anti-adhesion properties of compositions other than those described in this document.

The object of the present invention, accordingly, was to provide anti-adhesive, dirt-repellent coating compositions and also anti-adhesive, dirt-repellent polymeric moulding compounds which acquire the anti-adhesion and dirt repellency effects by virtue of an additive which is added in a low amount and which does not detract from the other properties of the coating compositions or polymeric moulding compounds, respectively. The coating compositions and polymeric moulding compounds of the invention are intended to retain virtually all of their anti-adhesion and dirt-repellency effects over a long period of, for example, several years, even under outdoor weathering conditions. This retention of properties also includes the permanence of the anti-adhesion effect over a plurality of cleaning cycles.

Surprisingly it has been found that this object can be achieved by adding to the coating compositions or polymeric moulding compounds a branched polymer additive comprising a polymeric base molecule and polydiorganosiloxane side chains bonded covalently to the base molecule. Particularly surprising is the fact that coating compositions and polymeric moulding compounds whose binder component or polymer is composed exclusively on the basis of branched polymers of this kind containing polydiorganosiloxane side chains are very much inferior in terms of their physical properties to standard coating compositions and polymeric moulding compounds which comprise these branched polymers merely as additives at an extremely low concentration. This makes it possible to use coating compositions and polymeric moulding compounds which have established themselves over many years of testing. The physical properties of the original coating compositions and polymeric moulding compounds, in respect for example of corrosion protection, gloss retention and weathering stability, are not adversely affected by the low concentrations of additive.

The present invention relates to coating compositions having anti-adhesion and dirt repellency properties, these compositions being admixed as additive with from 0.1 to 10% by weight, based on the solids content of the coating composition, of a branched polymer which possesses a weight-average molecular weight of from 2000 to 200,000 and comprises a polymeric base molecule and also polydiorganosiloxane side chains which are bonded covalently to the base molecule via Si—C bonds, have a weight-average molecular weight of between 1000 and 30,000, and whose fraction of the total weight of the branched polymer is from 5 to 25% by weight. The present invention further relates to polymeric moulding compounds having anti-adhesion and dirt repellency properties, to which this branched polymer is added as an additive in an amount of from 0.1 to 10% by weight, based on the total weight of the polymeric moulding compounds. The invention additionally relates to the use of the abovementioned branched polymers as additives for coating compositions and polymeric moulding compounds.

The polymeric base molecule of the branched polymer added as an additive to the coating compositions and polymeric moulding compounds of the invention is preferably a free-radical addition polymer, a polycondensate or a polyadduct and may also be constructed as a copolymer from structurally different monomeric units.

If the polymeric base molecule is a free-radical addition polymer, then all free-radically poly-merizable, ethylenically unsaturated compounds may be used as monomeric units of the base molecule. These are preferably compounds containing a (meth)acrylic, styryl, allyl, vinylbenzyl, vinyl ether, vinyl ester or vinyl ketone group.

Particularly preferred monomeric units of the base molecule in the case of free-radical addition polymerization are selected from the group consisting of alkenes and arylalkenes having from 2 to 30 carbon atoms, alkyl acrylates and alkyl methacrylates of straight-chain, branched or cycloaliphatic alcohols having from 1 to 22 carbon atoms, aralkyl acrylates and aralkyl methacrylates of aralkyl alcohols having from 8 to 18 carbon atoms, acrylamides and methacrylamides of straight-chain, branched or cycloaliphatic amines having from 1 to 22 carbon atoms, aminoalkyl acrylates and aminoalkyl methacrylates of straight-chain, branched or cycloaliphatic amino alcohols having from 2 to 8 carbon atoms, maleates, itaconates and fumarates of straight-chain, branched or cycloaliphatic alcohols having from 1 to 22 carbon atoms, vinyl esters, vinyl ethers and vinyl ketones having from 3 to 20 carbon atoms, vinyltrialkoxysilanes having from 5 to 8 carbon atoms, and methacryloyloxypropyltrialkoxysilanes having from 10 to 16 carbon atoms.

If the polymeric base molecule is a polycondensate, then all compounds which can be condensed to form a polymer may be used as monomeric units of the base molecule. As alcohol components for this purpose it is possible with preference to use ethylene glycol, propylene glycol, dipropylene glycol, 1,4-butanediol, 1,6-hexanediol, 2-ethylhexane-1,3-diol, neopentyl glycol, glycerol, trimethylolpropane, pentaerythritol and dipentaerythritol. As acid components for this purpose it is possible with preference to use phthalic acid, phthalic anhydride, isophthalic acid, terephthalic acid, tetrahydrophthalic acid, tetrahydrophthalic anhydride, adipic acid, sebacic acid, maleic acid, maleic anhydride, fumaric acid, trimellitic acid, trimellitic anhydride, pyromellitic acid and pyromellitic dianhydride. Preference is also given to caprolactone and valerolactone and their derivatives, and also β-propiolactone and dodecalactone.

If the polymeric base molecule is a polyadduct, then all compounds which may be linked to one another by polyaddition may be used as monomeric units of the base molecule. As polyadducts it is preferred to use polyadducts of diols having from 2 to 80 carbon atoms and diisocyanates, triisocyanates or polyisocyanates. All conventional aromatic, aliphatic, cycloaliphatic di-, tri- and polyfunctional isocyanates may be used. Preferred diisocyanates used are 1,6-hexamethylene diisocyanate, isophorone diisocyanate, 4,4'-biphenylene diisocyanate, tolylene diisocyanate, 4,4'-methylene-dicyclohexyl diisocyanate, 1,4-diisocyanatobutane, diphenylmethane diisocyanate, etc. Triisocyanates used with preference are triphenylmethane triisocyanate, 2,4,5-toluene triisocyanate, and the trimers of diisocyanates, e.g. of 1,6-hexamethylene diisocyanate and isophorone diisocyanate. Polyisocyanates such as polymethylenepolyphenyl isocyanate (PAPI) and isocyanurates (e.g. the trimers and polymers of hexamethylene diisocyanate and isophorone diisocyanate) may also be used.

As monomeric units of the base molecule it is also possible to use monomeric units containing polyethylene glycol, in order to allow the branched polymers of the invention to be soluble in water or emulsifiable in water. In the case of free-radical addition polymerization of the base molecule, for example, polyethylene glycol monoacrylates or polyethylene glycol monomethacrylates having from 5 to 80 carbon atoms may be used as polyethylene glycol-containing monomeric units. Such products are particularly suitable for aqueous paint systems.

Furthermore, monomeric units containing functional groups may be used in order to allow later binding into the respective polymeric matrix or the binder. In the case of free-radical addition polymerization of the base molecule, examples of monomeric units containing functional groups that may be used are acrylonitrile, acrylic acid, methacrylic acid, hydroxyalkyl acrylates or hydroxyalkyl methacrylates of straight-chain, branched or cycloaliphatic diols having from 2 to 36 carbon atoms, epoxyalkyl acrylates or epoxyalkyl methacrylates of straight-chain, branched or cycloaliphatic hydroxy epoxides having from 3 to 6 carbon atoms, or else vinyltrialkoxysilanes having from 5 to 8 carbon atoms. Ethylenically unsaturated compounds containing an isocyanate group, as well, such as isocyanatomethyl methacrylate or isopropenylcumyl isocyanate, for example, may be used in the case of free-radical addition polymerization of the base molecule.

In order greatly to reduce the surface tension of the branched polymers containing polydiorganosiloxane side chains, it is advantageous to copolymerize small amounts of monomeric units containing perfluoroalkyl groups. In the case of free-radical addition polymerization of the base molecule, for example, perfluoroalkyl acrylates or perfluoroalkyl meth-acrylates having from 6 to 20 carbon atoms may be used as monomeric units containing perfluoroalkyl groups.

In order to ensure sufficient compatibility of the branched polymers containing polydiorganosiloxane side chains with the coating compositions or polymeric moulding compounds, it is sensible to incorporate hydroxyl and acid functionality into the branched polymer. Preference is given to branched polymers of the invention having an OH number of between 70 and 150 mg KOH/g and an acid number of between 0.5 and 30 mg KOH/g. Also possible is the incorporation of polyesters in the form of caprolactone- and/or valerolactone-modified monomeric units into the polymeric base molecule. In the case of free-radical addition polymerization of the base molecule, preference is given here to caprolactone- and/or valerolactone-modified hydroxyalkyl acrylates and caprolactone- and/or valerolactone-modified hydroxyalkyl methacrylates having an average molecular weight of from 220 to 1200, the hydroxyalkyl acrylates and the hydroxyalkyl methacrylates preferably being derived from straight-chain, branched or cycloaliphatic diols having from 2 to 8 carbon atoms.

Very particularly preferred monomeric units of the base molecule in the case of free-radical addition polymerization are selected from the group consisting of acrylic acid, methacrylic acid, methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate, isobornyl methacrylate, hydroxyethyl acrylate, hydroxyethyl methacrylate, glycidyloxypropyl acrylate, glycidyloxypropyl methacrylate, vinyltriethoxysilane, methacryloyloxypropyltrimethoxysilane, isocyanatomethyl methacrylate, isopropenylcumyl isocyanate, styrene, α-methylstyrene, acrylonitrile, triethylene glycol monoacrylate, triethylene glycol monomethacrylate, ethyl vinyl ether, butyl vinyl ether, cyclohexyl vinyl ether, vinyl acetate, N,N-dimethylaminoethyl acrylate, N,N-dimethylaminoethyl methacrylate, N,N-dimethylaminopropyl acrylate, N,N-dimethylaminopropyl methacrylate, polyethylene glycol monoacrylate, polyethylene glycol monomethacrylate, and caprolactone- and/or valerolactone-modified hydroxyethyl acrylate and caprolactone- and/or valerolactone-modified hydroxy-ethyl methacrylate having a molecular weight of between 220 and 1200.

The polydiorganosiloxane side chains in the branched polymers added to the coating compositions and polymeric moulding compounds of the invention have a weight-average molecular weight of from 1000 to 30,000 and are attached to the polymeric base molecule via a Si—C bond. If the base molecule is a free-radical addition polymer, then the polydiorganosiloxane side chains may be copolymerized in the form of monoethylenically unsaturated polydiorganosiloxanes (i.e. polydiorganosiloxane macromonomers). As mono-ethylenically unsaturated polydiorganosiloxanes it is possible, for example, to use polydiorganosiloxane mono (meth)acrylates, polydiorganosiloxane monoalkenes, etc. If the base molecule is a polycondensate or polyadduct, then the polydiorganosiloxane groups may be copolymerized, for example, in the form of poly-diorganosiloxane monools.

An example of a monoethylenically unsaturated polydiorganosiloxane macromonomer which can be used to incorporate a polydimethylsiloxane side chain into the polymer by copolymerization is, for instance, α-butyldimethylsiloxy-ω-(3-methacryloyloxypropyl) poly-dimethylsiloxane:

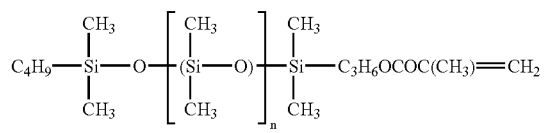

Further examples of polydimethylsiloxane side chains which may be copolymerized as polymethylsiloxane macromonomers into the polymeric base molecule are given, for example, in the publication by Koichi Ito, "*Polymeric Design by Macromonomer Technique*", Prog. Polym. Sci., Vol. 23, page 607, 1998, which also describes the preparation of these polydimethylsiloxanes modified at one chain end only.

In principle, however, the polydiorganosiloxane side chains may also be linked to the base molecule by reacting the polymeric base molecule with a monoterminally hydroxy-functional polydiorganosiloxane. Other monoterminally modified polydiorganosiloxanes, such as terminally epoxy-modified polydiorganosiloxanes, for example, may also be used, albeit with the proviso that the base molecule contains corresponding functional groups, such as hydroxyl groups or carboxyl groups, for instance.

An example of a monoterminally hydroxy-functional polydimethylsiloxane which can be used to incorporate a polydimethylsiloxane side chain into the polymer by reaction with the polymeric base molecule is, for example, α-butyldimethylsiloxy-ω-(3-(2-hydroxyethoxy)-propyl) polydimethylsiloxane:

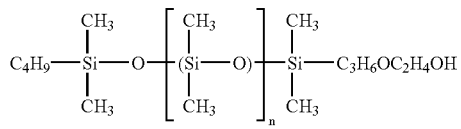

Additionally it is possible to obtain the branched polymers, for example, by transesterifying ester-containing polymers with monoterminally hydroxy-functional polydiorganosiloxanes. In this case it is also possible to use mixtures of monoterminally hydroxy-functional polydiorganosiloxanes having different chain lengths. The reaction of epoxy-functional or isocyanate-functional polymers with monoterminally hydroxy-functional and carboxy-functional polydiorganosiloxanes is a further possibility.

The preparation of the branched polymers by living free-radical addition polymerization and group transfer polymerization is also possible.

The weight-average molecular weight of the polydiorganosiloxane side chains is between 1000 and 30,000, preferably between 3000 and 10,000. The fraction of the polydiorganosiloxane side chains in the branched polymers is between 5 and 25% by weight, preferably between 7.5 and 12.5% by weight. To prepare the branched polymers it is possible to use polydiorganosiloxane side chains of identical length or mixtures of polydiorganosiloxane side chains differing in length.

The polydiorganosiloxane side chains are preferably attached by way of a structure selected from the following structures:

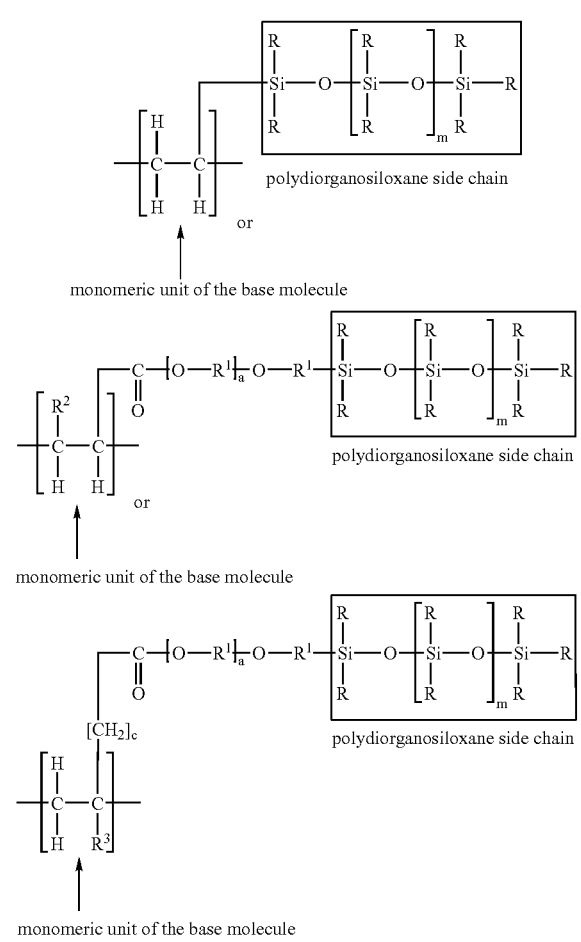

in which
the radicals R correspond to a straight-chain alkyl radical having from 1 to 8 carbon atoms or a perfluoroalkyl radical having from 3 to 10 carbon atoms, it being possible for the radicals R within a polydiorganosiloxane side chain to be identical or different,
the radicals $R^1$ correspond to a straight-chain or branched alkenyl radical having from 2 to 8 carbon atoms,
the radical $R^2$ corresponds to a hydrogen atom or to a radical —COOR' in which the radical R' is a hydrogen atom or a saturated or unsaturated, straight-chain, branched or cycloaliphatic alkyl radical having from 1 to 22 carbon atoms,
the radical $R^3$, if c is 1, corresponds to a radical —COOR' and, if c is 0, corresponds to a radical —(CH$_2$)—COOR' or to a methyl group, the radical R' being as defined above,
the coefficient a may adopt a value from 0 to 10, and
m is chosen such that the molecular weight of the polydiorganosiloxane side chains is between 1000 and 30,000.

The weight-average molecular weights of the branched polymers are situated in the range from 2000 to 200,000, preferably from 5000 to 75,000, with particular preference from 10,000 to 50,000.

The polymeric base molecules are prepared in a way which the skilled worker knows. In the case of free-radical addition polymerization of the base molecule, for example, preparation takes place by means of peroxides or azocompounds as free-radical initiators in organic solvents or in bulk. Suitable solvents include esters, such as ethyl acetate, n-butyl acetate or 1-methoxy-2-propyl acetate, for example, and aromatic solvents, such as toluene or xylene, for example, or else ketones, such as methyl isobutyl ketone or methyl ethyl ketone, for example. The choice of solvent is guided by the later intended use of the branched polymer. It is preferred to use low-boiling solvents in order that the solvents may be distilled off in the case of possible use of the branched polymer in pure form.

Suitable initiators include peroxides, such as tert-butyl peroxobenzoate or dibenzoyl peroxide, for example. It is also possible, however, to use azo compounds, such as azoisobutyronitrile (AIBN), for example. Peroxides are preferably used. The addition polymerization is conducted at temperatures from about 40° C. to 180° C., preferably from 100° C. to 150° C., with particular preference from 110° C. to 130° C.

The branched polymers may also be modified subsequently by means of polymer-analogous reaction. For example, a reactive double bond and an acid function may be incorporated by reacting a branched polymer containing hydroxy-functional monomeric units in its base molecule with maleic anhydride. Further suitable anhydrides for introducing the acid function are, for example, succinic anhydride, phthalic anhydride and trimellitic anhydride, a further possibility being the esterification of hydroxy-functional monomeric units within a branched polymer with structurally different anhydrides. For better solubility in water, the acid function may also be converted to the salt form using, for example, alkanolamines. Moreover, it is possible by subsequently acrylating and/or methacrylating the hydroxyl group to obtain products which can be incorporated securely into paint systems even in the case of radiation cure processes, such as UV and electron beam curing.

The coating compositions and polymeric moulding compounds of the invention may be used in pigmented or unpigmented form and may also comprise fillers such as calcium carbonate, aluminium hydroxide, reinforcing fibres such as glass fibres, carbon fibres and aramid fibres. Furthermore, the coating compositions and polymeric moulding compounds of the invention may comprise other customary additives, such as wetting agents and dispersants, light stabilizers, ageing inhibitors, etc.

The coating compositions of the invention preferably comprise at least one binder. The coating compositions of the invention are preferably coating compositions for producing anti-graffiti coatings, release coatings, self-cleaning facade coatings, ice-repelling coatings, for aircraft for example, car wheel coatings, dirt-repelling machine/instrument coatings, marine coatings (anti-fouling coatings), and dirt-repelling furniture coatings and release paper coatings. Owing to the outstanding compatibility of the branched polymers, they are also outstandingly suitable for producing transparent coatings.

The coating compositions of the invention contain the branched polymer additives in amounts of from 0.1 to 10% by weight, preferably from 0.5 to 7.5% by weight, with very particular preference from 1 to 5% by weight, based on the solids content of the coating composition. The branched polymers are added preferably in solution or emulsion form to the coating compositions of the invention.

The coating compositions of the invention may be applied to a large number of substrates, such as wood, paper, glass, ceramic, plaster, concrete and metal, for example. In a multi-coat process the coatings may also be applied to primers, primer-surfacers or basecoats. Curing of the coating compositions depends on the particular type of crosslinking and may take place within a wide temperature range from, for example, −10° C. to 250° C. Surprisingly, the coating compositions of the invention display very good anti-adhesion and dirt repellency properties even when cured at room temperature.

Owing to the extraordinarily good anti-adhesion effect of the coating compositions of the invention, even oily substances such as mineral oils, vegetable oils, or oily preparations are repelled, so enabling full discharge from corresponding oil-containing vessels. Accordingly, the coating compositions thus additived are also suitable for can interior coatings and drum interior coatings.

The polymeric moulding compounds of the invention are preferably lacquer resins, alkyd resins, polyester resins, epoxy resins, polyurethane resins, unsaturated polyester resins, vinyl ester resins, polyethylene, polypropylene, polyamides, polyethylene terepthlate, PVC, polystyrene, polyacrylonitrile, polybutadiene, polyvinyl chloride or mixtures of these polymers.

The polymeric moulding compounds of the invention contain branched polymer additives in amounts of from 0.1 to 10% by weight, preferably from 0.5 to 7.5% by weight, with very particular preference from 1 to 5% by weight, based on the total weight of the polymeric moulding compounds. The branched polymers are added preferably as 100% substances to the polymeric moulding compounds.

A) SYNTHESIS EXAMPLES FOR PREPARING THE BRANCHED POLYMERS

Synthesis Examples For Branched Free-radical Addition Polymers

Example 1

A four-necked flask provided with stirrer, thermometer, dropping funnel, distillation attachment and nitrogen inlet pipe is charged with 10 g of a polydimethylsiloxane macromonomer having a terminal methacrylic group and a weight-average molecular weight of 5000 and 100 g of methoxypropyl acetate, and these components are mixed thoroughly. Throughout the reaction, nitrogen is passed over the mixture. The temperature is raised to 122° C. and a mixture of 2 g of methacrylic acid, 42.7 g of isobutyl methacrylate, 26.0 g of hydroxypropyl methacrylate, 29.3 g of styrene and 1.5 g of Trigonox C (tert-butyl peroxybenzoate, Akzo Nobel, NL-Amersfoort) is metered in over the course of four hours. After the end of the metered addition, 0.25 g of Trigonox C are added immediately. After a further 30 minutes and 60 minutes, portions of 0.25 g of Trigonox C are added. The batch is then held at 122° C. for one hour more. The batch is clear and viscous. The OH number of the polymer solution is approximately 53 mg KOH/g. NMR-spectroscopic investigations show the expected signals of the polydimethylsiloxane-containing methacrylate.

Example 2

A four-necked flask provided with stirrer, thermometer, dropping funnel, distillation attachment and nitrogen inlet pipe is charged with 10 g of a polydimethylsiloxane macromonomer having a terminal methacrylic group and a weight-average molecular weight of 20,000 and 100 g of methoxypropyl acetate, and these components are mixed thoroughly. Throughout the reaction, nitrogen is passed over the mixture. The temperature is raised to 122° C. and a mixture of 2 g of methacrylic acid, 14.5 g of a caprolactone-modified hydroxyethyl acrylate (Tone M-100, Union Carbide, average molecular weight 344), 12 g of n-butyl methacrylate, 19.5 g of hydroxypropyl methacrylate, 22.8 g of styrene, 19.2 g of methyl methacrylate and 1.5 g of Trigonox C (tert-butyl peroxybenzoate, Akzo Nobel, NL-Amersfoort) is metered in over the course of three hours. After the end of the metered addition, 0.25 g of Trigonox C are added immediately. After a further 30 minutes and 60 minutes, portions of 0.25 g of Trigonox C are added. The batch is then held at 122° C. for one hour more. The batch is clear and viscous. The OH number of the polymer solution is approximately 53 mg KOH/g. NMR-spectroscopic investigations show the expected signals of the polydimethylsiloxane-containing (meth)acrylate.

Example 3

In a four-necked flask provided with stirrer, thermometer, dropping funnel and nitrogen inlet pipe, 34.5 g of a copolymer of styrene and maleic anhydride (SMA2000, Atofina, average molecular weight 2500, styrene/maleic anhydride ratio 2:1) are dissolved in 50.6 g of methoxypropyl acetate and the solution is heated to 120° C. Over 5 minutes, 3.75 g of a monoterminally hydroxy-functionally modified polydimethylsiloxane having a weight-average molecular weight of 1000 are metered in. 30 minutes later, 12.6 g of 2-ethylhexanol are metered in over 5 minutes. The reaction mixture is then held at 120° C. for 2 hours and at 50° C. for one hour. This gives a clear product having a solids content of about 50%. On IR-spectroscopic analysis, anhydride can no longer be seen. The average molecular weight of the polymer is about 3800. NMR-spectroscopic investigations show the expected signals of the polydimethylsiloxane-modified styrene/maleic monoester copolymer.

Example 4

A four-necked flask provided with stirrer, thermometer, dropping funnel, distillation attachment and nitrogen inlet pipe is charged with 10 g of a polydimethylsiloxane macromonomer having a terminal methacrylic group and a weight-average molecular weight of 5000 and 252 g of xylene, and these components are mixed thoroughly. Throughout the reaction, nitrogen is passed over the mixture. The mixture is heated to 130° C. and a mixture of 5 g of caprolactone-modified hydroxyethyl acrylate (Tone M-100, Union Carbide, average molecular weight 344), 49 g of n-butyl methacrylate, 12 g of hydroxyethyl methacrylate, 23.5 g of (α-methylstyrene and 1.5 g of Trigonox C (tert-butyl peroxybenzoate, Akzo Nobel, NL-Amersfoort) is metered in over the course of 220 minutes. After the end of the metered addition, the reaction mixture is held at 130° C. for a further hour. At this point the batch has a milky turbidity. To remove the solvents and excess reactants, the mixture is subjected to distillation under reduced vacuum. Following a distillation time of 2 hours at 130° C. and a vacuum of about 20 mbar, an opaque polymer having a weight-average molecular weight of approximately 14,700 is obtained in a yield of 54.5%. NMR-spectroscopic investigations show the expected signals of the polydimethylsiloxane-containing (meth)-acrylate.

Example 5

Preparation of a Polymer of the Invention by Group Transfer Polymerization

Preparation: All monomers and solvents are purified by passing them through glass columns containing neutral alumina.

A well-dried four-necked flask fitted with mechanical stirrer, reflux condenser, dropping funnel and a rubber septum is charged with 100 g of prepurified tetrahydrofuran under a dry $N_2$ atmosphere. Using syringes, 1.5 g of the initiator 1-methoxy-1-trimethylsiloxy-2-methylpropene and 0.15 ml of 1 M tetrabutylammonium 3-chlorobenzoate in acetonitrile, as catalyst, are added through the septum. A mixture of 70 g of butyl methacrylate and 20 g of N,N-dimethylaminoethyl methacrylate are added dropwise to the above reaction mixture over the course of 15 minutes. The reaction temperature is held at 40° C. using a waterbath. Following a post-reaction period of 10 minutes, a further 0.15 ml of 1 M tetrabutlylammonium 3-chlorobenzoate in acetonitrile is added, and 40 g of a 50% strength solution of a prepurified polydimethylsiloxane macromonomer having a terminal methacrylic group and a weight-average molecular weight of 1000 in THF are added dropwise over the course of 5 minutes. The reaction solution is left stirring for one hour without cooling and then 3 ml of ethanol are added in order to break the living chain ends. This gives a slightly opaque polymer solution.

Example 6

A four-necked flask provided with stirrer, thermometer, dropping funnel, distillation attachment and nitrogen inlet pipe is charged with 10 g of a polydimethylsiloxane macromonomer having a terminal methacrylic group and a weight-average molecular weight of 5000 and 100 g of DIBK, and these components are mixed thoroughly. Throughout the reaction, nitrogen is passed over the mixture. The mixture is heated to 122° C. and a mixture of 15 g of a caprolactone-modified hydroxyethyl acrylate (Tone M-100, Union Carbide, average molecular weight 344), 12 g of n-butyl acrylate, 20 g of hydroxyethyl methacrylate, 22.5 g of styrene, 20.5 g of methyl methacrylate and 1.5 g of Trigonox C (tert-butyl peroxybenzoate, Akzo Nobel, NL-Amersfoort) is metered in over the course of 180 minutes. After the end of the metered addition, the temperature is held at 122° C. Immediately after the metered addition, 30 minutes later, and a further 30 minutes later, portions of 0.25 g of Trigonox C are added. After the final addition, stirring is continued for one hour. The reaction mixture at this point is slightly opaque. To remove the solvent and excess reactants, the mixture is subjected to distillation under reduced vacuum. Following a-distillation time of 90 minutes at 140° C. and a vacuum of about 20 mbar, an opaque polymer is obtained in a yield of approximately 94%. The weight-average molecular weight was determined as being about 65,000 by means of gel permeation chromatography using polystyrene as standard.

Example 7

A four-necked flask provided with stirrer, thermometer, dropping funnel, distillation attachment and nitrogen inlet pipe is charged with 5 g of a polydimethylsiloxane macromonomer having a terminal methacrylic group and a weight-average molecular weight of 5000, 5 g of a polydimethylsiloxane macromonomer having a terminal methacrylic group and a weight-average molecular weight of 1000, 50 g of xylene and 50 g of butyl acetate, and these components are mixed thoroughly. Throughout the reaction, nitrogen is passed over the mixture. The mixture is heated to 122° C. and a mixture of 15 g of a caprolactone-modified hydroxyethyl acrylate (Tone M-100, Union Carbide, average molecular weight 344), 12 g of n-butyl acrylate, 20 g of hydroxyethyl methacrylate, 22.5 g of styrene, 20.5 g of methyl methacrylate and 1.5 g of Trigonox C (tert-butyl peroxybenzoate, Akzo Nobel, NL-Amersfoort) is metered in over the course of 180 minutes. After the end of the metered addition, the temperature is held at 122° C. Immediately after the metered addition, 30 minutes later, and a further 30 minutes later, portions of 0.25 g of Trigonox C are added. After the final addition, stirring is continued for one hour. To remove the solvent and excess reactants, the mixture is subjected to distillation under reduced vacuum. Following a distillation time of 90 minutes at 140° C. and a vacuum of about 20 mbar, a colourless polymer is obtained in a yield of approximately 99.5%. 50 g of this polymer are dissolved in a mixture of 25 g of xylene and 25 g of butyl acetate, and 0.05 g of p-toluenesulphonic acid and 0.42 g of maleic anhydride are added to the solution. After 3 hours' heating at 90° C., anhydride is no longer depictable in the IR spectrum.

Example 8

4.3 g of maleic anhydride are added to 50 g of the polymer solution from example 1, having an OH number of about 53 mg KOH/g, and the mixture is heated at 90° C. with stirring for six hours. Following this time, anhydride is no longer detectable in an IR-spectroscopic investigation. The result is a slightly yellow-coloured polymer solution with a strength of 56.3%.

Synthesis Example for a Polycondensate

Example 9

A three-necked flask provided with stirrer, thermometer and water separator is charged with 100 g of Setal 183 XX-60 (saturated polyester resin, in a supplied form of a 60% strength solution in xylene, acid number 8.3 mg KOH/g, Akzo Nobel Resins, NL-Bergen op Zoom) together with 7.5 g of a polydimethylsiloxane macromonomer having a terminal hydroxyl function and a weight-average molecular weight of 10,000 and 0.3 g of p-toluenesulphonic acid and the components are mixed thoroughly. The batch is then boiled at reflux for about six hours until the water formed has been removed. A temperature of about 142 to 145° C. is established. A polymer solution with a yellow-brown coloration is obtained. NMR-spectroscopic investigations show the expected structures of a polydiorganosiloxane with ester linkages. No OH groups are visible in the IR spectrum.

Synthesis Example for a Polyadduct

Example 10

A four-necked flask provided with stirrer, thermometer, nitrogen inlet pipe and dropping funnel is charged with 50 g of n-butyl acetate, 5.38 g of Desmodur N3300 (isocyanurate based on hexamethylene diisocyanate, NCO content 21.5%, Bayer AG, D-Leverkusen) and 10 g of a polydimethylsiloxane macromonomer having a terminal hydroxyl function and a weight-average molecular weight of about 1000 (OH number 51.5 mg KOH/g). Throughout the reaction, dry nitrogen is passed over the mixture. It is heated to 60° C. Then 0.2 g of a 1% strength solution of dibutylditin laurate in xylene is added. After 30 minutes, a further 0.7 g of a 1% strength solution of dibutylditin laurate in xylene is added and immediately the metered addition of a mixture of 50 g of n-butyl acetate, 25.17 g of isophorone diisocyanate, 55.79 g of Speziol C36/2 (dimer diol, OH number 205 mg KOH/g, Cognis Deutschland GmbH, D-Düsseldorf) and 3.2 g of 1-butanol is commenced. The mixture is added dropwise at a rate such that the temperature of the mixture does not rise above 65° C. The viscosity of the solution rises, and three hours after the end of the metered addition free isocyanate is no longer detectable titrimetrically. A clear, colourless solution is obtained. The weight-average molecular weight is determined as being 5200 by means of gel permeation chromatography.

B) PERFORMANCE TESTING OF THE BRANCHED POLYMERS IN THE COATING COMPOSITIONS OF THE INVENTION

The polymers of the invention were performance-tested in two varnish systems.

| 2-Component system, isocyanate-crosslinking: | |
|---|---|
| Base varnish: | |
| Macrynal SM 510n[1]), 60% in xylene/solvent naphtha/butyl acetate 2:1:1 | 75.00 |
| Dowanol PMA | 5.00 |
| Solvesso 100 | 5.00 |
| Xylene | 6.50 |
| Butyl acetate | 8.00 |
| Byk 066[2]) | 0.50 |
| | 100.00 |

All components are homogenized by stirring.

| Curing solution: | |
|---|---|
| Desmodur N3390[3]); 90% in butyl acetate/SN100 1:1 | 50.00 |
| Butyl acetate | 35.00 |
| Xylene | 15.00 |
| | 100.00 |

All components are homogenized by stirring.
[1])hydroxyl-containing acrylic resin, Vianova Resins, D-Frankfurt
[2])defoamer, Byk-Chemie, D-Wesel
[3])polyisocyanate, Bayer AG, D-Leverkusen Base varnish and curing solution are prepared independently of one another. The branched polymers prepared in examples 1, 2, 3, 4, 6 and 7 are stirred into the base varnish in a concentration of 2.67%, based on the solids content of the total varnish. For comparison, a hydroxyalkylpolydimethylsiloxane (TegoProtect 5000), a silicone polyacrylate (TegoProtect 5001) and a hydroxy-functional, linear, polyester-modified polydimethylsiloxane (Byk-370) are also incorporated. Shortly before application, base varnish and curing solution are mixed in a ratio of 2:1. Following incorporation, the additived varnishes are applied onto a primed aluminium panel in a 100 μm wet film using a wire-wound coating rod. After 30 minutes' drying at room temperature, the panels are cured at 80° C. for a further 30 minutes in a paint drying oven. Two panels per additived varnish are produced.

One panel of each pair is washed in a laboratory machine washer with a conventional household detergent at 80° C. After washing, the finished coated panels are conditioned at room temperature for at least 24 hours.

Thereafter, the untreated and the treated panels are subjected to the tests indicated below.

| Acrylate/melamine baking enamel: | |
|---|---|
| Setalux C1502[4] | 54.00% |
| Maprenal MF600[5] | 28.00% |
| Shellsol | 4.00% |
| Solvesso 150 | 4.00% |
| Xylene | 10.00% |
| Total | 100.00% |

[4] acrylate baking resin, Akzo Nobel Resins, NL-Bergen op Zoom
[5] melamine baking resin, Vianova Resins, D-Frankfurt Preparation of the Acrylate/Melamine Baking Enamel:

All of the components are mixed and the mixture is homogenized for 10 minutes using a dissolver at a peripheral speed of 5 m/s. The viscosity is then adjusted using xylene to 24 seconds, DIN 4 mm cup. The additives for testing are incorporated using a Skandex shaker in a concentration of 2% by weight active substance, based on the solids content of the enamel, for 10 minutes. For comparison, the compounds described in connection with the preparation of the baking enamel (TegoProtect 5000, TegoProtect 5001 and Byk-370) are added.

Following incorporation, the additived varnishes are applied onto a primed aluminium panel in a 100 μm wet film using a wire-wound coating rod. After a flash-off time of 10 minutes, the panels are baked at 140° C. for 20 minutes. Two panels per additived varnish are produced. One panel of each pair is washed in a laboratory machine washer with a conventional household detergent at 80° C. After washing, the finished coated panels are conditioned at room temperature for at least 24 hours. Thereafter, the untreated and the treated panels are subjected to the tests indicated below.

The enamel films obtained are tested for their dirt, water and oil repellency in accordance with the following criteria:

Edding Test:

The film surface is inscribed with an Edding 400 permanent marker and a visual assessment is made of whether the surface can be written on. An assessment is made on whether the ink wets the surface, or contracts. After the ink has dried, an attempt is made to remove it by wiping with a dry cloth.

Evaluation: 1 to 5:

1=Ink contracts, can be removed without residue using a paper cloth

5=Ink wets the substrate very well, and is virtually impossible to remove

Bitumen Test:

Bitumen is heated until sufficiently liquefied to be able to be applied to the enamel surface. After the bitumen mass has cooled, a visual assessment is made of how effectively it can be redetached from the surface manually without residue.

Evaluation: 1 to 5:

1=Bitumen can be removed easily and without residue

5=Bitumen adheres firmly to the surface and is virtually impossible to remove

Staining with Bayferrox Powder:

Three spoons of Bayferrox 130M iron oxide pigment from Bayer AG are scattered onto the enamel surface and rinsed off again using distilled water in 5 squirts using a wash bottle. The surface, as far as possible free of residue, is assessed visually.

Evaluation: 1 to 5:

1=Bayferrox powder can be washed off with water without residue

5=No cleaning effect on flushing with water; a large red spot remains

Water Run-off Test:

One drop of water is placed on the surface. The coated enamel surface is then inclined until the drop runs off. A visual assessment is made of the angle at which the drop runs off and of whether the drop runs off without residue.

Evaluation: 1 to 5:

1=Small angle is sufficient for the drop to run off completely without residue

5=Enamelled panel has to be inclined sharply until the drop runs off, residues of water may remain on the enamel surface Mineral Oil Run-off Test:

One drop of commercially customary mineral oil is placed on the enamel surface. The coated enamel surface is then inclined until the drop has run about 10 cm over the enamel surface. After 5 minutes, the oil track or drop reformation is evaluated visually.

Evaluation: 1 to 5:

1=The oil track immediately reforms into individual drops

5=The oil track does not reform but instead spreads further

Acrylate/Melamine Stoving Enamel:

| | Edding test | | Bayferrox test | | Water run-off test | | Oil run-off test | |
|---|---|---|---|---|---|---|---|---|
| | before cleaning | after cleaning | before cleaning | after cleaning | before cleaning | after cleaning | before cleaning | after cleaning |
| Example 1 | 1 | 1 | 1 | 2 | 1 | 1 | 1 | 1 |
| Example 2 | 1 | 2 | 1 | 4 | 1 | 3 | 3 | 4 |
| Example 3 | 1 | 1 | 1 | 5 | 2 | 4 | 2 | 3 |
| Example 4 | 1 | 1 | 2 | 4 | 1 | 2 | 3 | 4 |
| Example 6 | 1 | 1 | 1 | 2 | 1 | 3 | 2 | 2 |
| Example 7 | 1 | 1 | 1 | 2 | 1 | 2 | 2 | 2 |
| Byk-370 | 1 | 1 | 1 | 5 | 2 | 3 | 5 | 5 |
| TegoProtect 5000 | 1 | 1 | 5 | 5 | 1 | 5 | 2 | 5 |
| TegoProtect 5001 | 1 | 1 | 4 | 5 | 2 | 5 | 5 | 5 |

2-Component System, Isocyanate-crosslinking:

|  | Edding test | | Bayferrox test | | Bitumen test | | Water run-off test | | Oil run-off test | |
|---|---|---|---|---|---|---|---|---|---|---|
|  | before cleaning | after cleaning | before cleaning | after cleaning | before cleaning | after cleaning | before cleaning | after cleaning | before cleaning | after cleaning |
| Example 1 | 1 | 1 | 1 | 2 | 1 | 1 | 1 | 1 | 1 | 1 |
| Example 3 | 1 | 5 | 2 | 4 | 1 | 4 | 2 | 4 | 5 | 4 |
| Example 4 | 3 | 1 | 2 | 4 | 1 | 1 | 3 | 2 | 4 | 3 |
| Example 6 | 1 | 1 | 4 | 4 | 1 | 1 | 2 | 3 | 1 | 1 |
| Example 7 | 1 | 1 | 1 | 4 | 1 | 2 | 2 | 5 | 1 | 2 |
| Byk-370 | 1 | 1 | 4 | 5 | 1 | 1 | 3 | 5 | 5 | 5 |
| TegoProtect 5000 | 3 | 1 | 5 | 5 | 1 | 3 | 3 | 4 | 5 | 5 |
| TegoProtect 5001 | 5 | 5 | 5 | 5 | 5 | 5 | 5 | 5 | 5 | 5 |

C) PERFORMANCE TESTING OF THE BRANCHED POLYMERS IN THE POLYMERIC MOULDING COMPOUNDS OF THE INVENTION

Example: Gel Coat Mixtures

The polymer solution from example 8 is reacted in accordance with the table below with a gel coat and also Butanox M-50 to give the polymeric moulding compounds A and B (i.e. gel coat mixture A and gel coat mixture B).

Formulation (in per cent by weight) for the gel coat mixtures tested:

|  | Gel coat mixture A | Gel coat mixture B |
|---|---|---|
| Gel coat[1] | 97 | 97 |
| Butanox M-50[2] | 2 | 2 |
| Polymer solution from Example 8 | 1 |  |

[1]Free-radical initiator, Akzo Nobel, NL-Amersfoort
[2]Oldopal 733-0001, Büfa GmbH, D-Oldenburg The anti-adhesion properties of these gel coat mixtures are determined by the adhesion of these gel coats to metal plates. For this purpose, steel plates measuring 20×30×0.05 cm are first of all thoroughly degreased by washing with ethyl acetate. A release wax, TR-wax (T.R. Industries, US-Lynwood, Calif. 90262), is spread onto one steel plate using a paper cloth. After an evaporation time of 30 minutes, the plate is polished with a paper cloth.

Subsequently, gel coat mixture A is applied with a film thickness of 750 μm to the untreated metal plate and gel coat mixture B is applied with a film thickness of 750 μm to the waxed metal plate and also to an unwaxed plate. All of the gel coats are left to cure for three days. Thereafter, all of the gel coats are laminated twice with commercially customary glass fibre weave and a mixture of 98% unsaturated polyester resin Palatal P4-TV-28 (DBSR, NL-Zwolle) with 2% Butanol M-50 (free-radical initiator, Akzo Nobel, NL-Amersfoort). After curing, the gel coat is removed from the metal plate.

Result:

Gel coat mixture B cannot be removed from the unwaxed metal plate but can be removed from the waxed metal plate. The gel coat mixture A, equipped with an internal release agent, is easy to remove from the unwaxed metal plate. The surface of the gel coat mixture B from the waxed metal plate shows a characteristic structure brought about by the external release agent. The surface of the gel coat mixture A, equipped with an internal release agent, from the unwaxed metal plate is absolutely smooth and exhibits a high gloss.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

The invention claimed is:

1. A polymeric coating or molding composition having anti-adhesion and dirt repellency properties, comprising:
   (a) a branched polymer having a weight-average molecular weight of from 2000 to 200,000 and having cross-linking groups;
   (b) a polymer resin having cross-linking groups;
   wherein the branched polymer comprises a polymeric base molecule, having polydiorganosiloxane side chains with a weight-average molecular weight of between 1000 and 30,000;
   wherein the polydiorganosiloxane is from 5 to 25% by weight of the total weight of the branched polymer;
   wherein the branched polymer is from 0.1 to 10% by weight based on the total weight of the solids content of the coating composition;
   wherein the cross-linking groups of the branched polymer are within the polymeric base molecule and are functional groups of one or more monomers selected from the group consisting of acrylonitrile, (meth)acrylic acid, hydroxyalkyl (meth)acrylate, epoxyalkyl (meth)acrylate, isocyanatomethyl (meth)acrylate, isopropenylcumyl isocyanate and the olefinic acid ester of hydroxyalkyl (meth)acrylate, wherein the olefinic acid is selected from the group consisting of maleic anhydride, trimellitic anhydride, succinic anhydride, phthalic anhydride and (meth)acrylic acid;
   wherein the cross-linking groups of the polymer resin are one or more functional groups selected from the group consisting of pendant hydroxy groups, pendant olefinic groups, pendant carboxy groups and pendant amine groups; and, wherein the branched polymer and polymer resin are cross-linked to form the coating or molding composition displaying anti-adhesion and dirt repellency properties.

2. The composition according to claim 1, wherein the branched polymer is from 0.5 to 7.5% by weight based on the total weight of the solids content of the coating composition.

3. The composition according to claim 2, wherein the branched polymer is from 0.5 to 5% by weight, based on the solids content of the composition.

4. The composition according to claim 1, wherein the side chains are bonded with Si—C bonds.

5. The composition according to claim 1, wherein the polydiorganosiloxane side chains have the formula:

$$R-Si(R)(R)-O-\left[Si(R)(R)-O\right]_m-Si(R)(R)-R;$$

$$\underset{\|}{C}(O-R^1)_a-O-R^1-Si(R)(R)-O-\left[Si(R)(R)-O\right]_m-Si(R)(R)-R; \text{ and}$$

$$\underset{\|}{C}(O-R^1)_a-O-R^1-Si(R)(R)-O-\left[Si(R)(R)-O\right]_m-Si(R)(R)-R$$
$$(CH_2)_c$$

wherein the side chains are attached to moiety in the base molecule having the formula:

$$\left[\begin{array}{c}H\\|\\C-C\\|\\H\end{array}\begin{array}{c}|\\|\\H\end{array}\right]; \quad \left[\begin{array}{c}R_2\\|\\C-C\\|\\H\end{array}\begin{array}{c}|\\|\\H\end{array}\right]; \text{ and } \left[\begin{array}{c}H\\|\\C-C\\|\\H\end{array}\begin{array}{c}|\\|\\R^3\end{array}\right];$$

wherein
each R is independently a straight-chain alkyl radical having from 1 to 8 carbon atoms or a perfluoroalkyl radical having from 3 to 10 carbon atoms;
each $R^1$ is independently a straightchain or branched alkenyl radical having from 2 to 8 carbon atoms,
each $R^2$ is independently hydrogen or —COOR';
R' is hydrogen, or a saturated or unsaturated alkyl or cycloalkyl radical having from 1 to 22 carbon atoms;
$R^3$ is —COOR', when c is 0; or $R^3$ is —$(CH_2)$—COOR' or methyl, when c is 1;
c is 0 or 1;
a is an integer from 0 to 10, and
m is an integer that provides polydiorganosiloxane side chains having a molecular weight of from 1000 to 30,000.

6. The composition according to claim 5, wherein a is an integer from 0 to 5.

7. The composition according to claim 1, wherein the base molecule is a free-radical addition polymer, a polycondensate or a polyadduct.

8. The composition according to claim 1, wherein the base molecule comprises monomeric units selected from the group consisting of:
alkenes and arylalkenes having from 2 to 30 carbon atoms;
alkyl acrylates and alkyl methacrylates of straight-chain, branched or cycloaliphatic alcohols having from 1 to 22 carbon atoms;
aralkyl acrylates and aralkyl methacrylates of aralkyl alcohols having from 8 to 18 carbon atoms;
polyethylene glycol monoacrylates or polyethylene glycol methacrylates having from 5 to 80 carbon atoms;
hydroxyalkyl acrylates and hydroxyalkyl methacrylates of straight-chain, branched or cycloaliphatic diols having from 2 to 36 carbon atoms;
epoxyalkyl acrylates and epoxyalkyl methacrylates of straight-chain, branched or cycloaliphatic hydroxy epoxides having from 3 to 6 carbon atoms;
acrylamides and methacrylamides of straight-chain, branched or cycloaliphatic amines having from 1 to 22 carbon atoms;
aminoalkyl acrylates and aminoalkyl methacrylates of straight-chain, branched or cycloaliphatic amino alcohols having from 2 to 8 carbon atoms;
maleates, itaconates and fumarates of straight-chain, branched or cycloaliphatic alcohols having from 1 to 22 carbon atoms;
perfluoroalkyl acrylates and perfluoroalkyl methacrylates having from 6 to 20 carbon atoms;
vinyl esters, vinyl ethers and vinyl ketones having from 3 to 20 carbon atoms;
vinyltrialkoxysilanes having from 5 to 8 carbon atoms, methacryloyloxypropyltrialkoxysilanes having from 10 to 16 carbon atoms; and
caprolactone- or valerolactone-modified hydroxyalkyl acrylates.

9. The composition according to claim 8, wherein the hydroxyalkyl acrylates are hydroxyethyl acrylate and hydroxyethyl methacrylate.

10. The composition according to claim 8 wherein the hydroxyalkyl acrylates and the hydroxyalkyl methacrylates comprise straight-chain, branched or cycloaliphatic diols having from 2 to 8 carbon atoms.

11. The composition according to claim 9, wherein the caprolactone- or valerolactone-modified hydroxyalkyl acrylates and hydroxyalkyl methacrylates have an average molecular weight of from 220 to 1200.

12. The composition according to claim 9, wherein the base molecule comprises monomer units selected from the group consisting of acrylic acid, methacrylic acid, methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate, isobornyl methacrylate, hydroxyethyl acrylate, hydroxyethyl methacrylate, glycidyloxypropyl acrylate, glycidyloxypropyl methacrylate, vinyltriethoxysilane, methacryloyloxy-propyltrimethoxysilane, isocyanatomethyl methacrylate, isopropenylcumyl isocyanate, styrene, α-methylstyrene, acrylonitrile, triethylene glycol monoacrylate, triethylene glycol monomethacrylate, ethyl vinyl ether, butyl vinyl ether, cyclohexyl vinyl ether, vinyl acetate, N,N-dimethylaminoethyl acrylate, N,N-dimethylaminoethyl methacrylate, N,N-dimethylaminopropyl acrylate, N,N- dimethyl-aminopropyl methacrylate, polyethylene glycol monoacrylate, and polyethylene glycol monomethacrylate.

13. The composition according to claim 1, wherein the fraction of the polydiorganosiloxane side chains in the total weight of the branched polymer is from 5 to 20% by weight.

14. The composition according to claim 13, wherein the fraction of the polydiorganosiloxane side chains in the total weight of the branched polymer is from 7.5 to 12.5% by weight.

15. The composition according to claim 1, wherein the branched polymer has a weight-average molecular weight of from 5000 to 75,000.

16. The composition according to claim 1, wherein the branched polymer has a weight-average molecular weight of from 10,000 to 50,000.

17. The composition according to claim 1, wherein the polymer resin comprises a lacquer resin, alkyd resin, polyester resin, epoxy resin, polyurethane resin, unsaturated polyester resin, vinyl ester resin, polyethylene, polypropylene, polyamide, polyethylene terephthalate, polyvinyl chloride, polystyrene, polyacrylonitrile, polybutadiene, polyvinyl chloride or mixtures of these polymers wherein each of the polymer resins is cross-linkable through a free radical or a polyisocyanate cross-linking agent.

18. The composition according to claim 1, which is a polymeric coating composition.

19. The composition according to claim 1, which is a polymeric molding composition.

20. The composition according to claim 19, which has been adapted for anti-graffiti coatings, release coatings, self-cleaning facade coatings, ice-repelling coatings, car wheel coatings, dirt-repelling machine/instrument coatings, anti-fouling coatings for ships, and dirt-repelling furniture coatings or release paper coatings.

21. The composition according to claim 1, wherein the branched polymer is from 1 to 5% by weight based on the total weight of the solids content of the coating composition.

22. The composition according to claim 1, wherein upon curing, the branched polymer reacts with the polymer resin to provide the coating composition.

23. The composition according to claim 1, wherein the branched polymer comprises monomeric units containing hydroxyl or acid functionality.

24. The composition according to claim 1 further comprising a cross-linking agent, which cross-linking agent is a free radical agent and the cross-linking groups of the polymer resin and branched polymer are olefinic groups, or which cross-linking agent is a polyisocyanate and the cross-linking groups of the polymer resin and the branched polymer are hydroxyl groups or amine groups or a combination thereof or which cross-linking agent is an internal cross-linking group of the polymer resin and the branched polymer and the internal cross-linking group is carboxyl, hydroxyl, isocyanate or a combination thereof.

* * * * *